US 8,041,889 B2

(12) United States Patent
Miyamoto

(10) Patent No.: US 8,041,889 B2
(45) Date of Patent: Oct. 18, 2011

(54) INFORMATION PROCESSOR AND IMAGE GENERATOR FOR STOPPING ROTATION OF A MAGNETIC DISK IN RESPONSE TO AN ABNORMAL STATE

(75) Inventor: Masayoshi Miyamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1145 days.

(21) Appl. No.: 11/533,608

(22) Filed: Sep. 20, 2006

(65) Prior Publication Data

US 2007/0070532 A1    Mar. 29, 2007

(30) Foreign Application Priority Data

Sep. 27, 2005  (JP) .................................. 2005-280497
Jul. 28, 2006   (JP) .................................. 2006-207025

(51) Int. Cl.
*G06F 12/16* (2006.01)

(52) U.S. Cl. . 711/112; 711/156; 711/163; 711/E12.103; 360/74.5

(58) Field of Classification Search ........................ None
See application file for complete search history.

(56) References Cited

U.S. PATENT DOCUMENTS

| 4,875,063 A | 10/1989 | Idenawa et al. |
| 7,151,643 B2 * | 12/2006 | Tsuda ............................. 360/75 |
| 7,308,587 B2 * | 12/2007 | Inui et al. ...................... 713/310 |

FOREIGN PATENT DOCUMENTS

| JP | 2001-186296 | 7/2001 |
| JP | 2002-62763 | 2/2002 |
| JP | 2002-254779 | 9/2002 |
| JP | 2003-298793 | 10/2003 |
| JP | 3613610 | 11/2004 |

* cited by examiner

*Primary Examiner* — Reginald Bragdon
*Assistant Examiner* — Eric Loonan
(74) *Attorney, Agent, or Firm* — Oblon, Spivak, McClelland, Maier & Neustadt, L.L.P.

(57) ABSTRACT

An information processor includes a rotating magnetic disk that stores therein data, an accessing unit that accesses the magnetic disk, a detecting unit that detects an abnormal state. The abnormal state is a state that a user takes an action that may cause the magnetic disk to vibrate. The information processor further includes a control unit that terminates an access to the magnetic disk and stops rotation of the magnetic disk when the detecting unit detects the abnormal state, and an output unit that outputs a request for the action after the control unit has stopped the access and the rotation.

14 Claims, 14 Drawing Sheets

INFORMATION PROCESSOR AND IMAGE GENERATOR FOR STOPPING ROTATION OF A MAGNETIC DISK IN RESPONSE TO AN ABNORMAL STATE

CROSS-REFERENCE TO RELATED APPLICATIONS

The present document incorporates by reference the entire contents of Japanese priority documents, 2005-280497 filed in Japan on Sep. 27, 2005 and 2006-207025 filed in Japan on Jul. 28, 2006.

BACKGROUND OF THE INVENTION

1. Field of the Invention

The present invention relates to an image processor and an image generator that access a rotating magnetic disk.

2. Description of the Related Art

Copiers, printers, multifunction products (MFP), and the likes use a hard disk drive (HDD) to store image data and buffer data. While the HDD is inexpensive and suitable to store large-volume data, structure of the HDD is vulnerable to shock. When the HDD is subjected to shock, a magnetic head that is normally floating can contact a platter and scratch the platter, and particles resulting from the scratch can float in the HDD to consequently damage the platter. This causes loss of important data.

When a chassis of the MFP is closed after fixing a paper jam and the like, a force applied to the chassis transfers to the HDD as a shock, which is assumed to be a cause of the data loss.

To protect the HDD from vibration and shock transferred from a movable unit in an image generator, for example, Japanese Patent Application Laid-open No. 2002-62763 discloses a technology to extend the life of a motor that rotates the platter and to prevent heat shock and heat deterioration due to the heat caused by the rotation of the motor by stopping the rotation of the platter in standby mode.

However, if the rotation stops after vibration in the movable unit is detected, the HDD can receive a shock from the vibration. Therefore, it is required to stop the rotation of the platter before vibration or the like occurs.

SUMMARY OF THE INVENTION

It is an object of the present invention to at least partially solve the problems in the conventional technology.

According to an aspect of the present invention, an information processor includes a rotating magnetic disk that stores therein data, an accessing unit that accesses the magnetic disk, a detecting unit that detects an abnormal state, the abnormal state being a state that a user takes an action that may cause the magnetic disk to vibrate, a control unit that terminates an access from the accessing unit to the magnetic disk and stops rotation of the magnetic disk when the detecting unit detects the abnormal state, and an output unit that outputs a request for the action to the user after the control unit has stopped the access and the rotation.

According to another aspect of the present invention, an image generator includes a rotating magnetic disk that stores therein data, an accessing unit that accesses the magnetic disk, a detecting unit that detects an abnormal state, the abnormal state being a state that a user takes an action that may cause the magnetic disk to vibrate, a control unit that terminates an access from the accessing unit to the magnetic disk and stops rotation of the magnetic disk when the detecting unit detects the abnormal state, and an output unit that outputs a request for the action to the user after the control unit has stopped the access and the rotation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail referring to the accompanying drawings. The present invention is not limited to the embodiments explained below.

Figure 1:
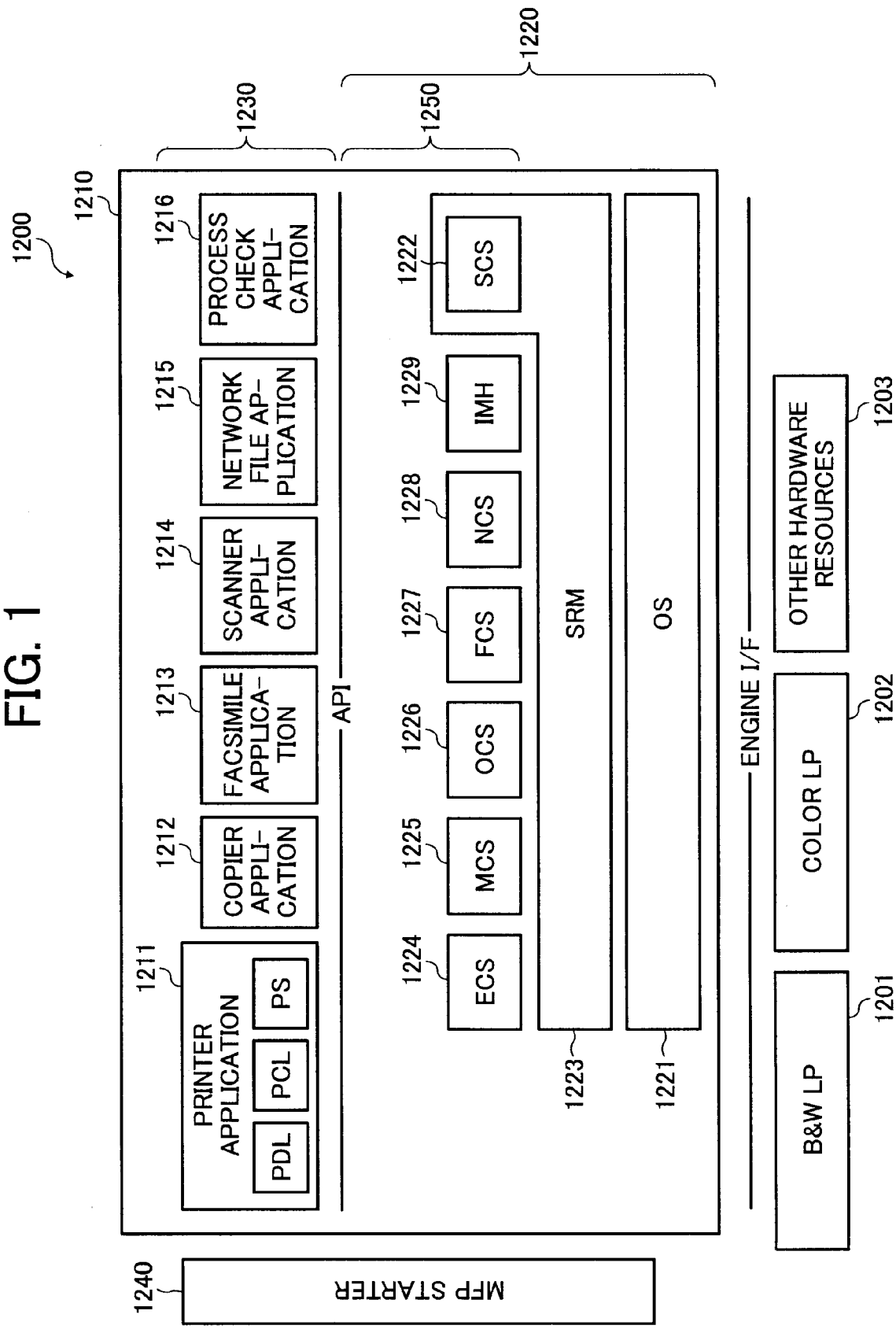
FIG. 1 is a block diagram of a multifunction product including various image-forming functions according to an embodiment of the present invention.

FIG. 1 is a block diagram of an MFP 1200 including various image-forming functions according to an embodiment of the present invention.

The MFP 1200 includes a black and white (B&W) line printer 1201, a color line printer 1202, hardware resources 1203, a software group 1210 including a platform 1220 and applications 1230, and a MFP starter 1240. The hardware resources 1203 includes a scanner, a facsimile, a plotter engine, a memory device, a hard disk drive (HDD) file, and a host input/output such as a Centronics interface, a network interface, an IEEE1394 interface, an RS232C interface and the like.

The MFP starter 1240 is driven right after the MFP 1200 is turned on, and activates the platform 1220 and the applications 1230.

The platform 1220 interprets a process request from the applications 1230, and includes a control service 1250, a system resource manager (SRM) 1223, and an operating system (OS) 1221. The control service 1250 generates a request to acquire a hardware resource. The SRM 1223 manages one or more hardware resources and arbitrates the request from the control service 1250.

The control service 1250 includes a system control service (SCS) 1222, an engine control service (ECS) 1224, a memory control service (MCS) 1225, an operation panel control service (OCS) 1226, a facsimile control service (FCS) 1227, a network control service (NCS) 1228, and an imaging memory handler (IMH) 1229. The platform 1220 includes an application program interface capable of receiving requests from the applications 1230 using a predetermined function.

The OS 1221 can be the UNiplexed Information and Computing System (UNIX-registered trademark) or the like, and runs the platform 1220 and each of the applications 1230 in parallel. Use of an open-source UNIX ensures security of a program, and network accessibility, thereby facilitating to obtain a source code. Further, the OS 1221 and transmission control protocol/internet protocol (TCP/IP) are available on a royalty-free basis, and outsourcing is easy.

The SRM 1223 controls systems and manages resources with the SCS 1222. The SRM 1223 performs an arbitration based on a request from an upper layer that uses the hardware resources 1203.

More specifically, the SRM 1223 determines whether the requested hardware resource is available, and notifies the upper layer that the hardware resource is available when it is available.

Otherwise, the SRM 1223 can be configured to schedule the use of the hardware resources 1203 based on requests from the upper layer to directly perform requested operation such as paper feeding and image generation by a printer engine, memory allocation, and file creation.

The SCS 1222 performs a plurality of functions including application management (first function), operating unit control (second function), display on a system display panel such as a job list display and a counter display (third function), light-emitting diode (LED) indication (fourth function), resource management (fifth function), interrupting application management (sixth function), and the like. More specifically, the first function is to register an application and to notify other applications of the registration information. The second function is to control, exclusively, the authority of the application to access an operating unit. The third function is to display a warning corresponding to an engine status based on a request from the authorized application. The fourth function is to control system LEDs such as a warning LED and an application key. The fifth function is to perform services for controlling the engine resources such as the scanner and a stapler to be excluded when the application or the ECS 1224 performs a job. The sixth function is to perform control and service for prioritizing operation of a specific application.

The SCS 1222 controls access to a hard disk drive (HDD) 1303 and rotation of a rotating magnetic disk (hereinafter, "platter") of the HDD 1303 via the OS 1221.

When the SCS 1222 stops the HDD 1303, the SCS 1222 unloads or retracts a magnetic head slider of the HDD 1303 from the platter to a safe position. The MFP 1200 employs a ramp load technology for unloading the magnetic head slider. The ramp load technology is known as disclosed in Japanese Patent Application Laid-open No. 2000-132937, and an explanation thereof is omitted. Unloading the magnetic head to the safe position prevents the magnetic head from contacting the platter due to a user's action while the HDD 1303 is not active. In this manner, data in the HDD 1303 can be protected.

The ECS 1224 controls engines of the B&W line printer 1201, the color line printer 1202, and other hardware resources 1203. More specifically, the ECS 1224 scans and prints an image, notifies statuses, and fixes a paper jam.

The MCS 1225 controls memory data. More specifically, the MCS 1225 acquires and releases image data, reads data from the HDD 1303 and stores the data, and compresses and decompresses the image data.

The OCS 1226 controls an operation panel that is an interface between the user and the MFP to exchange information. More specifically, the OCS 1226 notifies the MFP of an input from the user, provides library functions by which each application defines a graphical user interface (GUI), manages information on the GUI with respect to each application, and displays information on the operation panel.

The FCS 1227 provides an application program interface (API) for facsimile communication via a public switched telephone network (PSTN) or an integrated services digital network (ISDN) from each application layer of a system controller, registering and referencing facsimile data stored in a backup static random access memory (BKM), facsimile scanning, facsimile receipt and printing, and integrated communication.

The NCS 1228 includes modules that provide common services to applications that require network input/output. More specifically, the NCS 1228 assigns data received from the network based on each protocol to each application, and mediates data transmission from the application to the network.

According to the embodiment, the NCS 1228 controls the data communication with network equipment connected via the Internet by a hypertext transfer protocol (HTTP) using a hypertext transfer protocol daemon (httpd), starts a plurality of web services required for a process specified by an HTTP request header using a function call, and notifies the network equipment of results of the web services using an HTTP response. The web services are processed according to messages described in, for example, an extensible markup language (XML).

The ITMH 1229 extracts image data from a virtual memory area and maps it to a physical memory. In response to activation of each process, the IMH 1229 makes a system call, maps the virtual memory area for the process, and releases the mapped virtual memory area at the end of the process.

The applications 1230 include a printer application 1211 for a printer, a copier application 1212 for a copier, a facsimile application 1213 for a facsimile machine, a scanner application 1214 for a scanner, a network file application 1215 for network files, and a process check application 1216 for checking processes. The printer that uses the printer application 1211 uses a page description language (PDL), a printer control language (PCL), and a post script (PS). The applications 1211 to 1216 are executed using the processes on the platform 1220, and are based on a display control program that controls a display panel, input from the user, and generates the job. A new application can be installed via the network connected to the NCS 1228. Each of the applications can be installed and uninstalled as needed.

In this manner, the MFP 1200 performs all the processes commonly required for the applications on the platform 1220.

Figure 2:
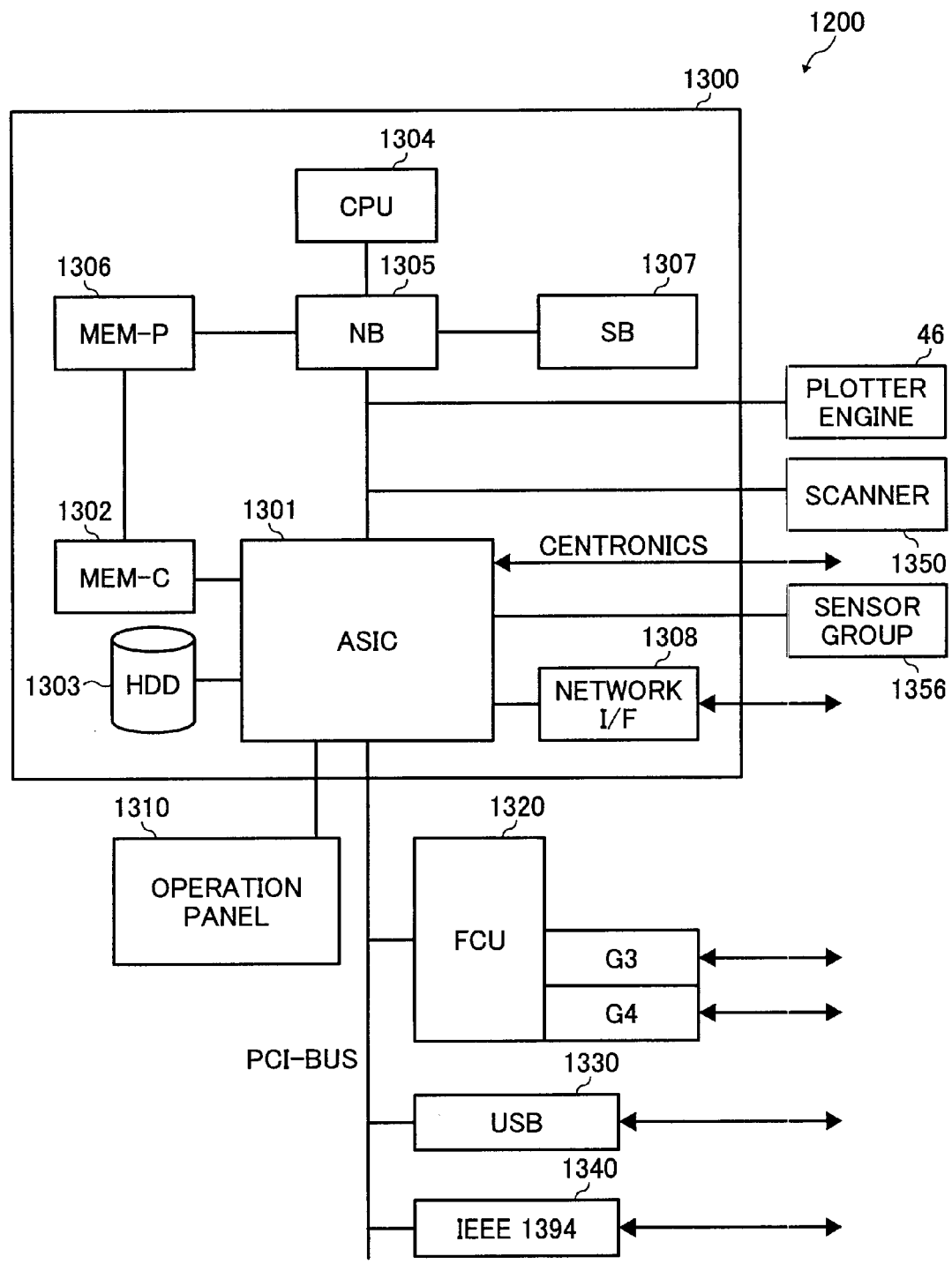
FIG. 2 is a block diagram of a hardware configuration of the multifunction product.

FIG. 2 is a block diagram of a hardware configuration of the MFP 1200. The MFP 1200 includes an operation panel 1310, a facsimile control unit (FCU) 1320, a universal serial bus (USB) 1330, an IEEE1394 serial bus 1340, a sensor group 1356, a plotter engine 46, and a scanner 1350, each connected to an application specific integrated circuit (ASIC) 1301 in a controller 1300 with a peripheral component interconnect (PCI) bus or the like. The FCU 1320, the USB 1330, and the IEEE1394 serial bus 1340 are interfaces with a facsimile machine and other external units.

In the controller 1300, the ASIC 1301 is connected to a MEM-C 1302, the HDD 1303, and the like. The ASIC 1301 is connected to a central processing unit (CPU) 1304 via a north bridge (NB) 1305, a CPU chipset, because an interface for the CPU 1304 is not published. The ASIC 1301 is also connected with the Centronics interface and a network interface 1308 for communication via a network.

The CPU 1304 controls the entire MFP 1200. More specifically, the CPU 1304 executes each of the SCS 1222, the SRM 1223, the ECS 1224, the MCS 1225, the OCS 1226, the FCS 1227, and the NCS 1228 on the OS 1221 as a process, and runs the printer application 1211, the copier application 1212, the facsimile application 1213, the scanner application 1214, the network file application 1215, and the process check application 1216 on the OS 1221.

The NB 1305 connects the CPU 1304 to a MEM-P 1306, a south bridge (SB) 1307, and the ASIC 1301. The MEM-P 1306 is a system memory used as a drawing memory in the MFP 1200. The SB 1307 connects the NB 1305 to a read only memory (ROM), a PCI device, and peripheral devices. The MEM-C 1302 is a local memory used as a code buffer or an image buffer for the copier. The ASIC 1301 is an image processing IC. The plotter engine 46 is a printing unit for image data and prints the image on transfer paper. The transfer paper is supplied from a paper feed tray in the MFP 1200. The scanner 1350 scans the image data on an original.

The MFP 1200 includes an automatic document feeder (ADF) that feeds the original to be scanned by the scanner 1350. The ADF can be existing equipment, and is not shown in FIG. 2.

The HDD 1303 stores therein image data, programs, font data and formats, and is connected to the MFP 1200 via a bus, or included in the MFP 1200. The MFP 1200 can use a detachable storage that includes a rotating magnetic disk such as the HDD 1303.

Figure 3:
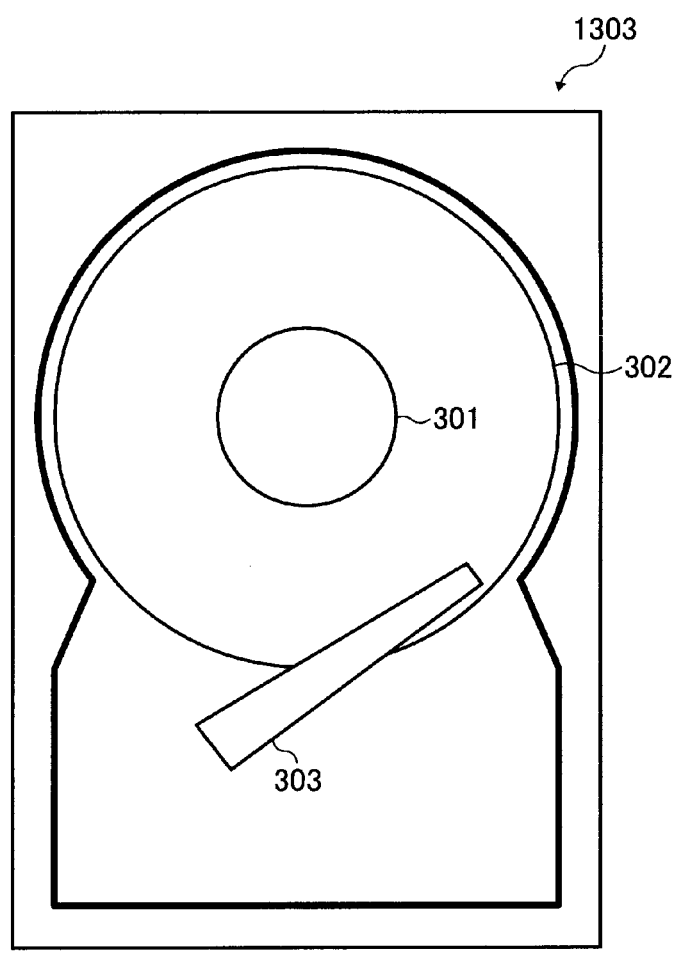
FIG. 3 is a plan view of a hard disk drive shown in FIG. 2.

FIG. 3 is a plan view of the HDD 1303. The HDD 1303 includes a platter 302, a motor 301 that rotates the platter 302, and an arm 303 with a magnetic head that reads data from the platter 302 and writes data to the platter 302. The SCS 1222 controls the rotation of the platter 302 by controlling the motor 301 via the OS 1221. The MFP 1200 according to the embodiment performs control to prevent contact between the magnetic head and the platter 302 due to the user's action during the rotation of the platter 302.

Returning to the explanation of FIG. 2, the operation panel 1310 accepts inputs from the user and displays information for the user.

The ASIC 1301 includes a random access memory (RAM) interface to connect to the MEM-C 1302 and a hard disk interface to connect to the HDD 1303. The RAM interface and the hard disk interface are switched to input the image data to either one of the MEM-C 1302 and the HDD 1303 or output the image data from either one of them.

The sensor group 1356 detects a failure in the MFP 1200 that requires a recovery effort likely to cause a shock to the MFP 1200. More specifically, the sensor group 1356 detects a paper-out condition on the paper feed tray, a paper jam in the ADF, a paper jam with the transfer paper from the paper feed tray, and a lack of toner used to generate an image.

Figure 4:
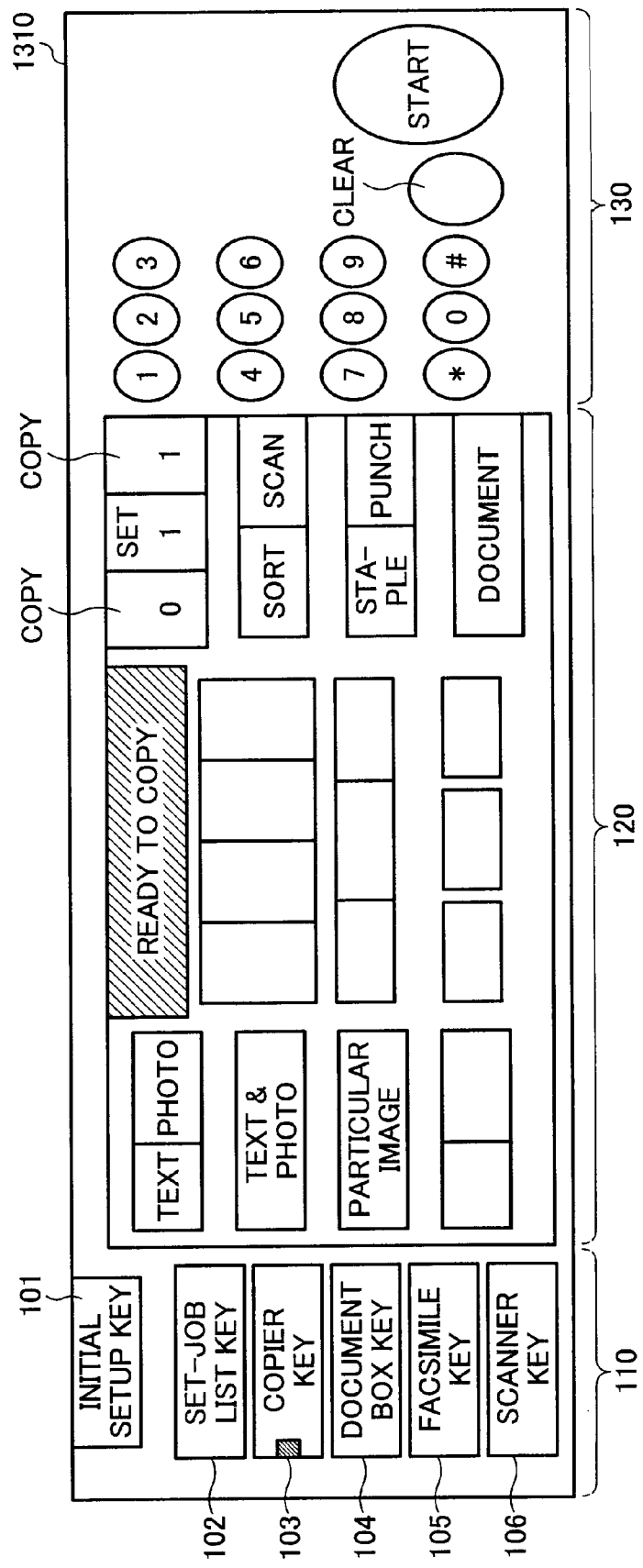
FIG. 4 is a schematic of an example of an operation panel shown in FIG. 2.

FIG. 4 is a schematic of an example of the operation panel 1310. The operation panel 1310 includes a function selecting area 110 for selecting a function, a setting display 120 for setting details, and a key entry area 130 for a key entry. The function selecting area 110 includes an initial setup key 101 for initial settings, a set-job list key 102 for displaying a set-job list, a copier key 103 for making a copy, a document box key 104 to display document names stored in a document box, a facsimile key 105 for sending a document by facsimile, and a scanner key 106 for scanning an image. For example, when the user presses the copier key 103, the operation panel 1310 indicates that the copier key 103 is selected and the setting display 120 displays detailed information for making a copy.

Figure 5:
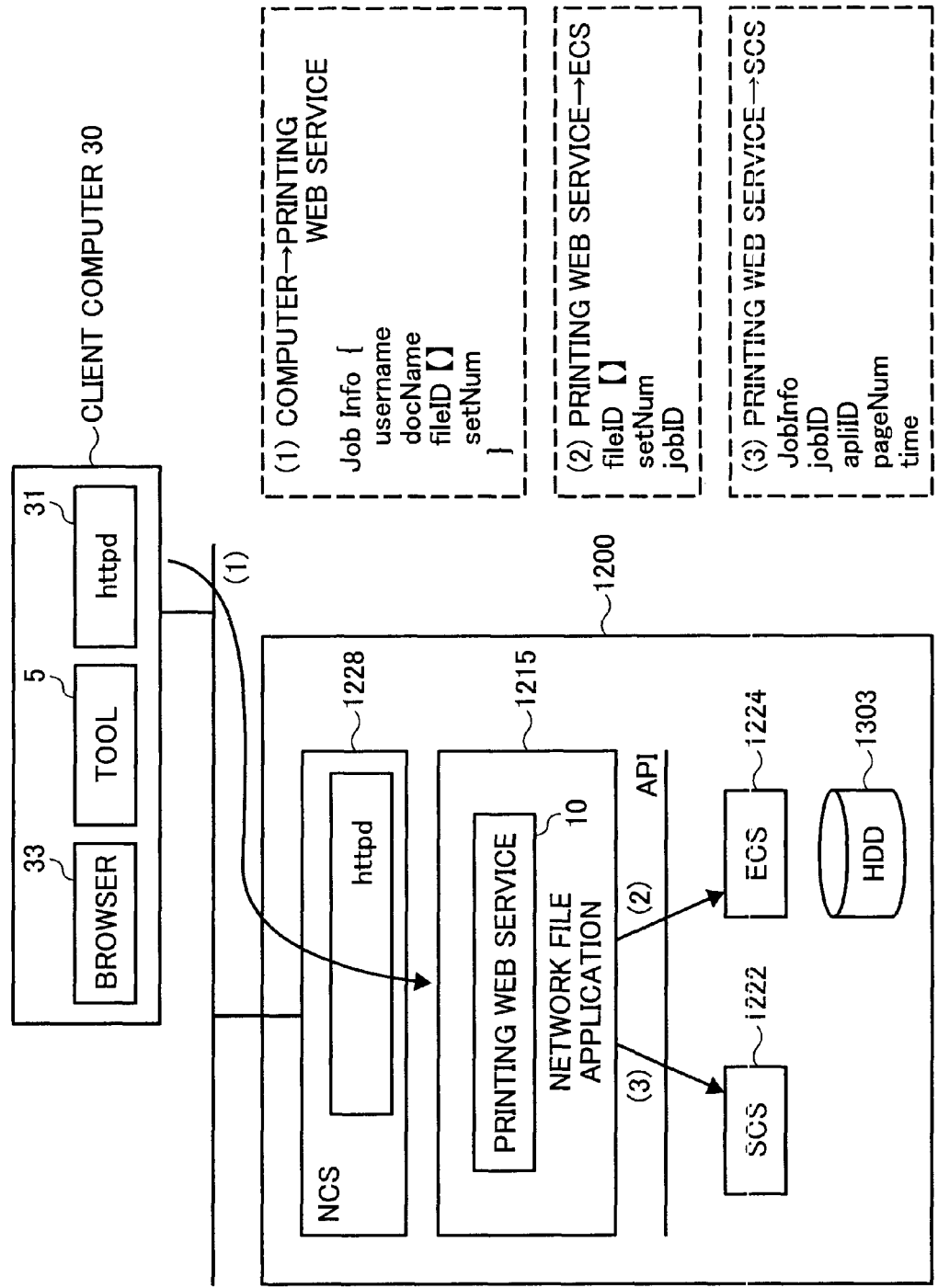
FIG. 5 is a schematic for explaining an example of a printing web service.

FIG. 5 is a schematic for explaining an example of a printing web service. A client computer 30 includes a httpd 31 that controls data communication based on HTTP, a browser 33 that displays information on a display unit (not shown) using a hypertext markup language (HTML), and a tool 5 that processes HTTP requests and HTTP responses based on a simple object access protocol (SOAP). The tool 5 is a program used to exchange messages with the MFP 1200 based on the SOAP. The tool 5 is installed on the client computer 30 from a recording medium such as a compact disk read only memory (CD-ROM) storing therein a program that implements the tool 5. The recording medium is not limited to the CD-ROM, and can be any computer-readable recording medium. The program is also available by downloading.

When the client computer 30 issues an instruction to print a document in the HDD 1303, the client computer 30 sends job information (JobInfo) to a printing web service 10 in the MFP 1200 (1). In this case, the printing web service 10 is included in the network file application 1215. The job information includes a user name (username), a document name (docName), identifiers of files to be printed at a time (hereinafter, "file ID") (fileID), and the number of sets to be printed (hereinafter, "set number") (setNum).

The printing web service 10 provides a web service of receiving an HTTP request that includes the job information based on the SOAP and printing a requested file according to the job information.

When the printing web service 10 receives the job information, the printing web service 10 extracts the file ID and the set number from the job information, generates a printing job that includes the file ID, the set number, and a unique printing job ID assigned to the job, and submits the printing job to the ECS 1224 (2). After the job entry to the ECS 1224, the printing web service 10 registers the job information, the printing job ID (jobID), an application ID (apliID) indicative of the network file application 1215, the number of pages in the job (hereinafter, "page number") (pageNum), and job entry time (time) to the SCS 1222 as a job (3). The printing process is to be controlled by the ECS 1224, and the job status is to be managed by the SCS 1222.

Referring to printing priority, the ECS 1224 determines a queue that includes a job to be printed, and extracts the job from the queue. The ECS 1224 sends the status and finish time of the printing job to the application 1230. The application 1230 sends information on the display of the printing job to the SCS 1222. The SCS 1222 stores therein the received information to display it on the operation panel 1310 and respond to a request for a job list from the application 1230.

Figure 6:
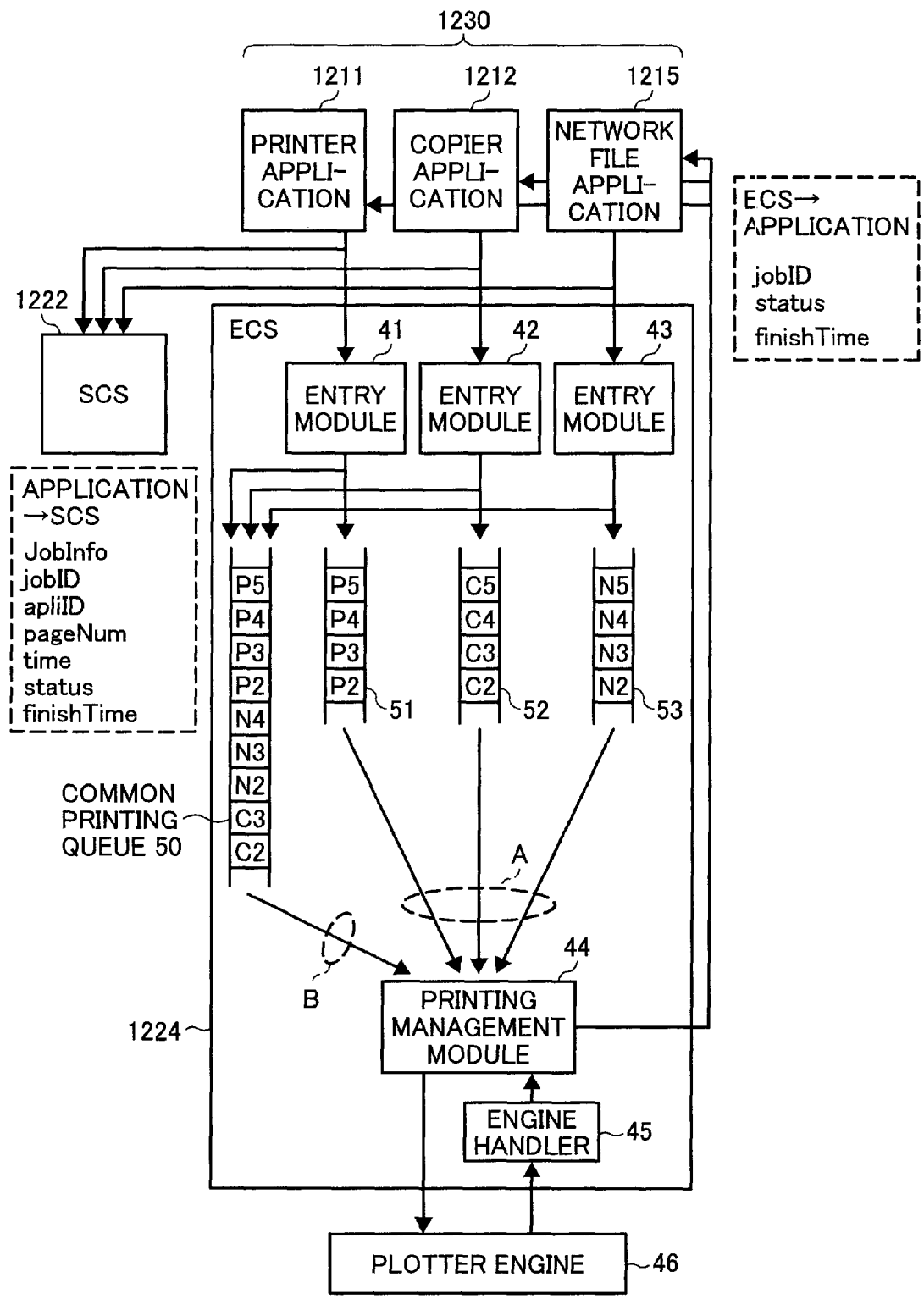
FIG. 6 is a schematic for explaining job management performed by an engine control service (ECS) shown in FIG. 1.

FIG. 6 is a schematic for explaining a process of managing jobs by the ECS 1224 and sending display information to the SCS 1222. The ECS 1224 includes entry modules 41, 42, and 43 that accept a job entry from the corresponding one of the applications 1230, a common printing queue 50 including a first-in-first-out (FI/SO) process, the plotter engine 46, an engine handler 45 that receives information from the plotter engine 46, and a printing management module 44 that manages the printing process. The following explanation cites the printer application 1211, the copier application 1212, and the network file application 1215 as examples of the applications 1230.

Each of the applications 1230 registers a printing job to the SCS 1222, and submits the printing job to a corresponding one of the entry modules 41, 42, and 43 in the ECS 1224. The ECS 1224 determines whether the printing job requested by the application 1230 can be queued in the corresponding one of the entry modules 41, 42, and 43. When the printing job can be queued, the ECS 1224 registers the file ID, the set number, and the job ID passed from the application 1230 with a printing job status (status) and the finish time of printing (hereinafter, "finish time") (finishtime) to the common printing queue 50.

The printing management module 44 extracts a single job from the common printing queue 50 at a time and sends it to the plotter engine 46 to perform the printing process. The printing management module 44 receives information from the plotter engine 46 via the engine handler 45, and writes the status of the job in the printing job status and the time that changes as printing progresses in the finish time. At the same time, the printing management module 44 sends information to the SCS 1222. An interface with the SCS 1222 will be detailed later. The printing job status, the finish time, and the time continue to be updated. Upon receiving a notice of completion of printing from the engine handler 45, the printing management module 44 sends information to the applications 1230 and the SCS 1222.

In FIG. 6, the FI/FO processes that correspond to the entry modules 41, 42, and 43 to queue the printing jobs are printing queues 51, 52, and 53. The printing jobs from each of the applications 1230 are submitted to the corresponding one of the printing queues 51, 52, and 53 and the common printing queue 50 at the same time.

The ECS 1224 switches between an input A from the printing queues 51, 52, and 53 and an input B from the common printing queue 50 to the printing management module 44 based on the printing priority set by the user.

Figure 7:
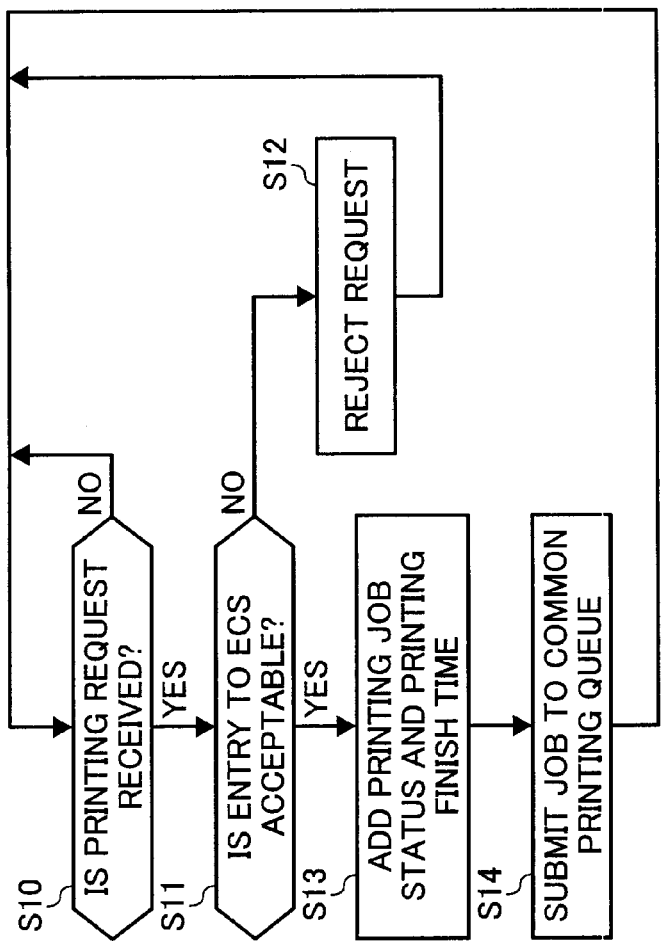
FIG. 7 is a flowchart of a process performed by each entry module shown in FIG. 6.

FIG. 7 is a flowchart of a process performed by each of the entry modules 41, 42, and 43. Each of the entry modules 41, 42, and 43 determines whether it received a printing request (step S10). When no printing request is received (NO at step S10), the entry module repeats step S10 until it receives a printing request. When the entry module received the printing request (YES at step S10), it determines whether an entry to the ECS 1224 is acceptable (step S11). When the entry to the ECS 1224 is not acceptable (NO at step S11), the printing request is rejected (step S12). When the entry to the ECS 1224 is acceptable (YES at step S11), the printing job status and the finish time are added to a printing job (step S13). The entry module submits the printing job to the common printing queue 50 (step S14), and the process returns to step S10 to repeat steps S10 to S14.

Figure 8:
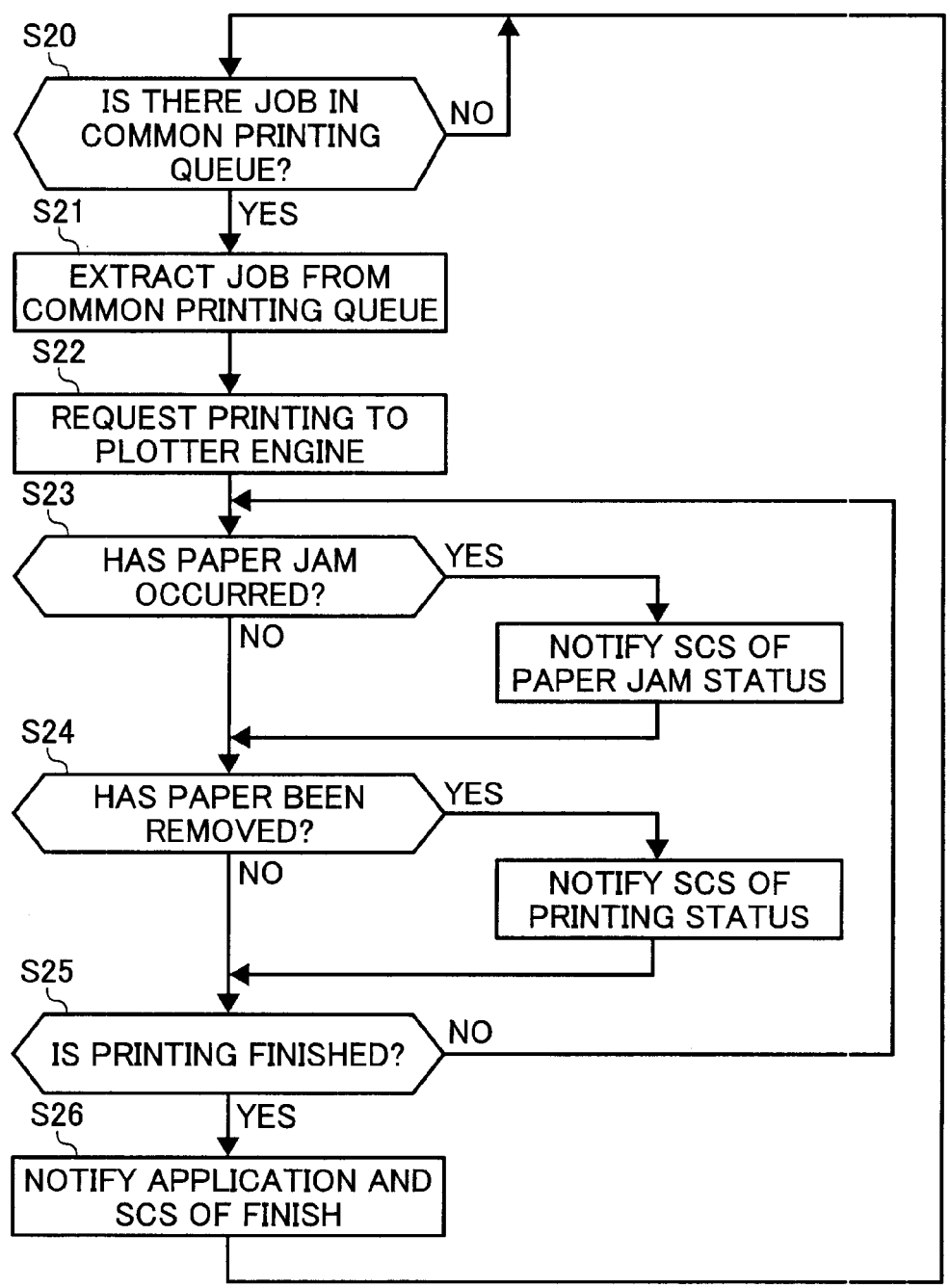
FIG. 8 is a flowchart of a process performed by a printing management module shown in FIG. 6.

FIG. 8 is a flowchart of a process performed by the printing management module 44. The printing management module 44 determines whether there is a job entry in the common printing queue 50 (step S20). When there is no job in the common printing queue 50 (NO at step S20), the printing management module 44 repeats step S20 until a job is submitted to the common printing queue 50. When there is a job in the common printing queue 50 (YES at step S20), the printing management module 44 extracts the job from the common printing queue 50 (step S21), and requests printing to the plotter engine 46 (step S22). Upon receiving a notice of a paper jam from the plotter engine 46, the printing management module 44 informs the SCS 1222 of a status of the paper jam (step S23), and informs the SCS 1222 of a status of printing upon receiving a notice that the paper jam is cleared (step S24). The printing management module 44 then determines whether printing is finished (step S25). If printing is not finished, the printing management module 44 repeats steps S23 to S25. If printing is finished, the printing management module 44 notifies the application 1230 that requested printing and the SCS 1222 of the completion of printing (step S25), and the process returns to step S20 to repeat steps S20 to S26.

Figure 9:
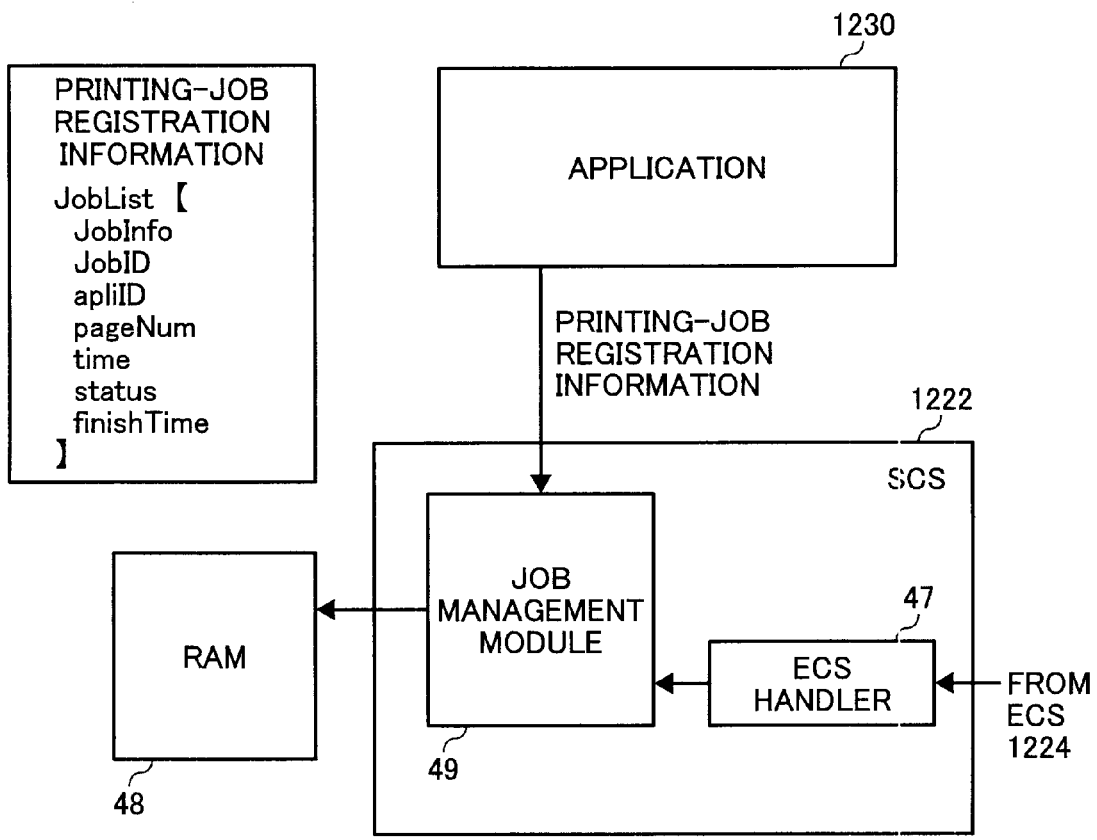
FIG. 9 is a schematic for explaining job management performed by a system control service (SCS) shown in FIG. 1.

FIG. 9 is a schematic for explaining a process of the job management performed by the SCS 1222. The SCS 1222 is a module that manages the entire MFP 1200, and includes various functions in addition to job management. However, only main functions are shown for convenience of explanation. The SCS 1222 includes a job management module 49 that accepts printing-job registration information from the application 1230 and an ECS handler 47 that receives notices from the ECS 1224. The printing-job registration information registered from the application 1230 is stored in a memory in the form of a structure.

The job management module 49 stores a job list structure (JobList) as a piece of the job registration information in a RAM 48. The job list structure includes the job information, the job ID, the application ID, the page number, and the job entry time, all of which are registered from the application 1230 as well as the job status and the finish time, both of which are passed from the ECS 1224.

The job information, the job ID, the application ID, the page number, and the job entry time in the RAM 48 can be referenced by the SCS 1222 and other components such as the applications 1230. This enables the applications 1230 and other components to perform various processes based on the job information or the job ID registered in the SCS 1222.

Figure 10:
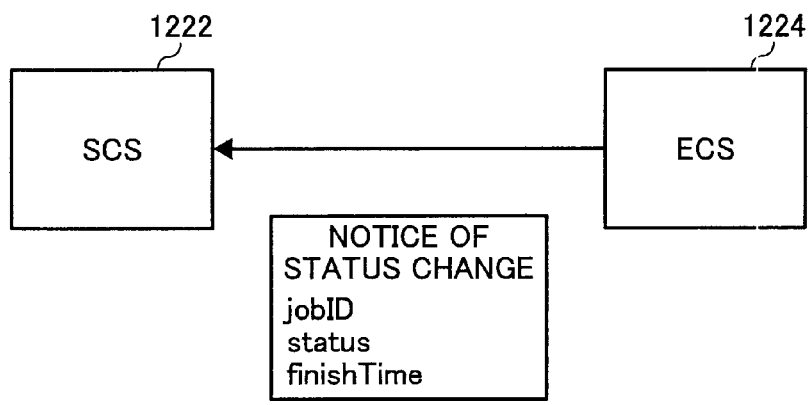
FIG. 10 is a schematic of an example of an interface between the ECS and the SCS.

FIG. 10 is a schematic of an example of the interface between the ECS 1224 and the SCS 1222. A function call, an event notice, or the like can be used as an interface between the ECS 1224 and the SCS 1222. Every time the status of the printing job changes, the ECS 1224 sends information to the SCS 1222. The information includes the job ID, the printing job status, and the finish time.

When the SCS 1222 receives the information from the ECS 1224, the SCS 1222 determines whether the same job ID is included in the job registration information registered by the SCS 1222. When the job ID is included, the SCS 1222 revises the job status and the finish time in the printing-job registration information. However, if the SCS 1222 is informed of a finish status, the SCS 1222 deletes the printing-job registration information to exclude the corresponding job from the object of the job management because the printing process for the job is completed.

Figure 11:
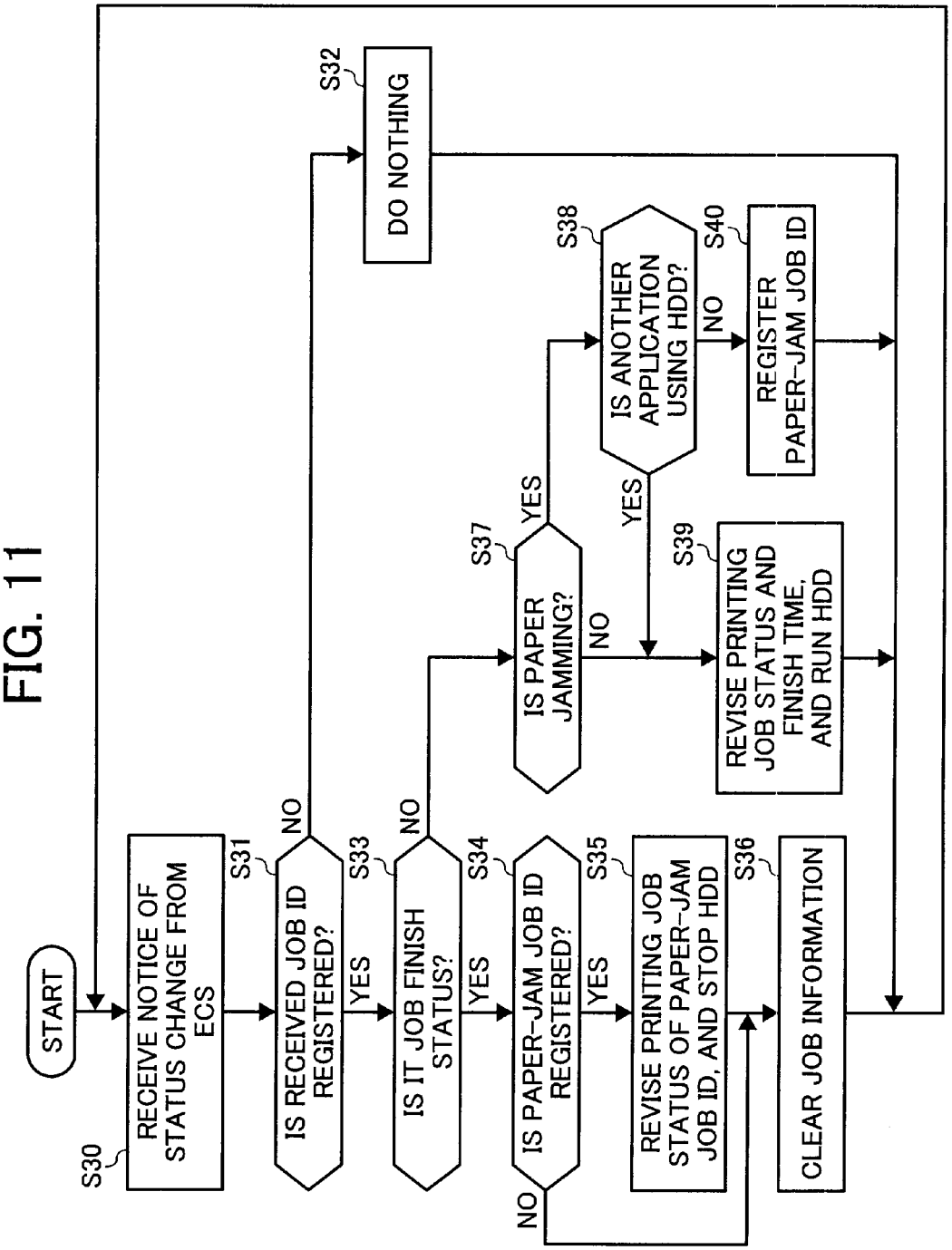
FIG. 11 is a flowchart of a process performed by the SCS after receiving a notice of a status change from the ECS.

FIG. 11 is a flowchart of a process performed by the SCS 1222 after receiving a notice of a status change from the ECS 1224.

When the SCS 1222 receives the notice of the status change from the ECS 1224 (step S30), the SCS 1222 determines whether the job ID of the notice is registered (step S31). When the job ID is not registered (NO at step S31), the SCS 1222 does not do anything, and enters a wait state (step S32), and finishes the process.

When the job ID is registered (YES at step S31), the SCS 1222 determines whether the new status is the finish status (step S33). When the new status is not the finish status (NO at step S33), the SCS 1222 determines whether the new status is a paper jam status (step S37). When the new status is the paper jam status (YES at step S37), the SCS 1222 determines whether the HDD 1303 is being used by another application (step S38).

The other application is one of the applications 1230 that is performing another process in the MFP 1200 in parallel with the application that is performing the printing job. The other application can be, for example, the facsimile application 1213 or the network file application 1215.

When the HDD 1303 is used by the other application (YES at step S38), the SCS 1222 does not register a paper-jam job ID while the HDD 1303 is in use, and the HDD 1303 continues running (step S39). In this manner, the process by the other application that is not related to a paper jam can be properly performed.

When the HDD 1303 is not used by the other application (NO at step S38), the SCS 1222 registers the paper-jam job ID (step S40).

When the new status is not the paper jam status (NO at step S37), the SCS 1222 revises the printing job status and the finish time, and runs the HDD 1303 (step S39).

When the new status is the finish status (YES at step S33), the SCS 1222 determines whether the paper-jam job ID is registered (step S34). When the paper-jam job ID is not registered (NO at step S34), the SCS 1222 clears the job information and stops the HDD 1303 (step S36) to finish the process. This stops the rotation of the platter in the HDD 1303. When the paper-jam job ID is registered (YES at step S34), the SCS 1222 revises the status of the corresponding paper-jam job ID to a parameter indicating that the HDD 1303 stopped (step S35).

The SCS 1222 repeats steps S30 to S40. In this manner, after the paper-jam job ID is registered at step S40, the SCS 1222 resumes the process from step S30. The SCS 1222 then determines that the paper-jam job ID is registered at step S34, and stops the HDD 1303 at step S35.

Figure 12:
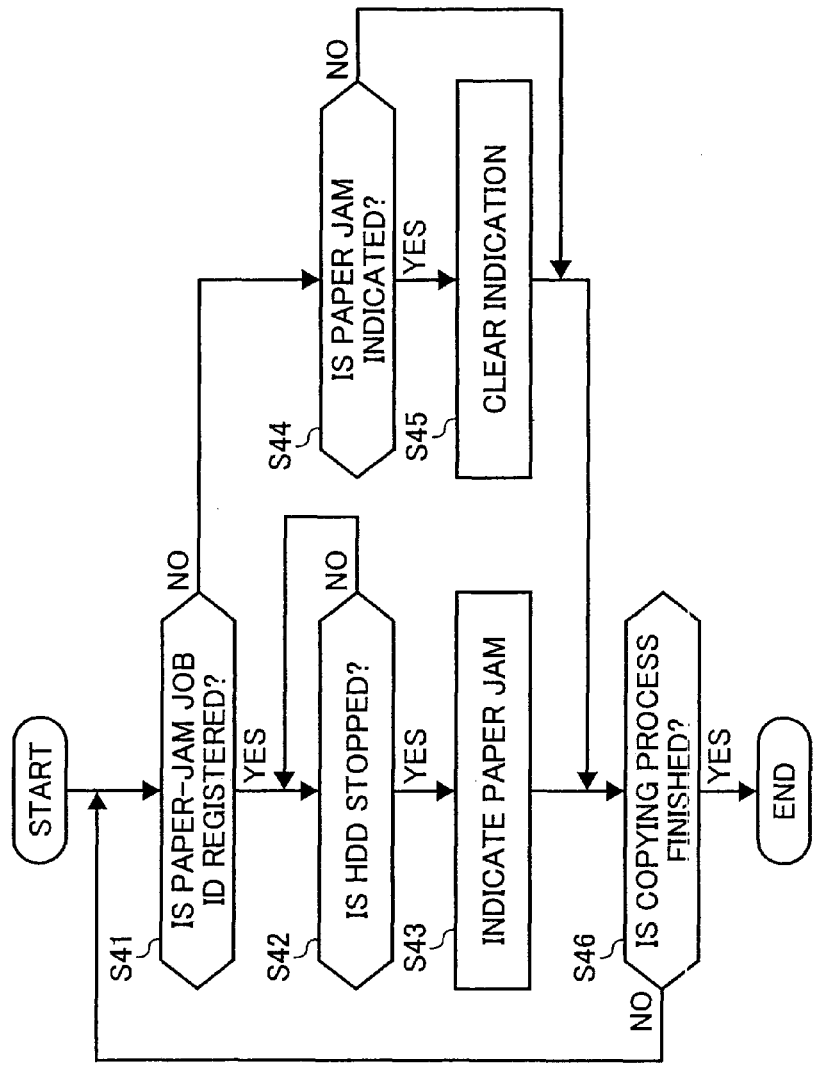
FIG. 12 is a flowchart of a process in which a copier application shown in FIG. 1 indicates on the operation panel that a paper jam has occurred.

FIG. 12 is a flowchart of a process in which the copier application 1212 indicates on the operation panel 1310 that a paper jam has occurred. This represents processes in which one of the applications 1230 indicates occurrence of a trouble that requires an action by the user.

The copier application 1212 refers to the RAM 48 and determines whether the paper-jam job ID is registered to the RAM 48 (step S41).

When it is determined that the paper-jam job ID is registered (YES at step S41), the copier application 1212 references the status of the paper-jam job ID and checks whether the HDD 1303 is stopped (step S42).

When the HDD 1303 is not stopped (NO at step S42), the copier application 1212 again checks whether the HDD 1303 is stopped after a predetermined time period (step S42).

When the HDD 1303 is stopped (YES at step S42), the copier application 1212 indicates on the operation panel 1310 that a paper jam has occurred (step S43).

Figure 13:
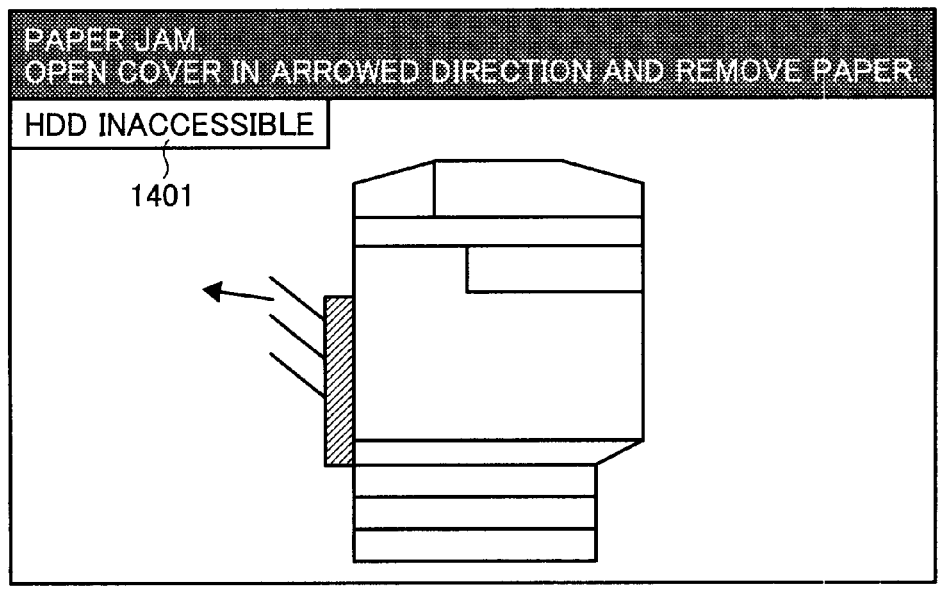
FIG. 13 is an example of a display on the operation panel when a paper jam occurs.

FIG. 13 is an example of the display on the setting display 120 on the operation panel 1310 when a paper jam occurs. The display indicates that the printing paper is jammed inside and the action to be taken to remove the printing paper that caused the paper jam. This enables the user to fix the paper jam.

In addition, the copier application 1212 indicates "HDD INACCESSIBLE" in a display area 1401 shown in FIG. 13. By viewing the display area 1401, the user recognizes that writing data to the HDD 1303 and reading data from the HDD 1303 are not possible.

On the other hand, when the paper-jam job ID is not registered (NO at step S41), the copier application 1212 determines whether an indication of the paper jam is displayed on the operation panel 1310 as shown in FIG. 13 (step S44). When the indication is not displayed (NO at step S44), the copier application 1212 does not perform any specific process.

When the indication is displayed (YES at step S44), the copier application 1212 clears the setting display 120 (step S45).

The copier application 1212 determines whether the copying process is finished (step S46). When the copying process is not finished (NO at step S46), the process returns to step S41. In this manner, the copier application 1212 repeats steps S41 to S45.

When the copying process is finished (YES at step S46), the copier application 1212 finishes the process.

By performing the process as described above, when a paper jam is detected, the copier application 1212 indicates the occurrence of the paper jam after the stop of the HDD 1303 is confirmed. This prevents vibration of the MFP 1200 due to a recovery action taken by the user while the HDD 1303 is active. As a result, the magnetic head of the HDD 1303 is prevented from contacting the platter due to the user's action while the platter is rotating.

While the explanation is on the assumption that the copier application 1212 displays a warning on the operation panel 1310, other applications perform a similar process.

As described above, even if a paper jam occurs while a plurality of jobs is being performed, the data in the HDD 1303 is protected by displaying the indication of the paper jam on the operation panel 1310 after stopping the HDD 1303. If there is another job that is accessing the data in the HDD 1303 at the same time, the accessing job is prioritized and the indication of the paper jam is displayed after the job is finished, whereby the data in the HDD 1303 can be protected.

Besides, the above explanation is on the assumption that printing paper fed from the paper feed tray is jammed in the plotter engine 46. However, a paper jam can occur in a process that the ADF feeds originals to be scanned.

The following explanation is on the assumption that paper is jammed when the copier application 1212 is scanning and storing documents. The same process is performed when a paper jam occurs while any of other applications is reading an original.

Figure 14:
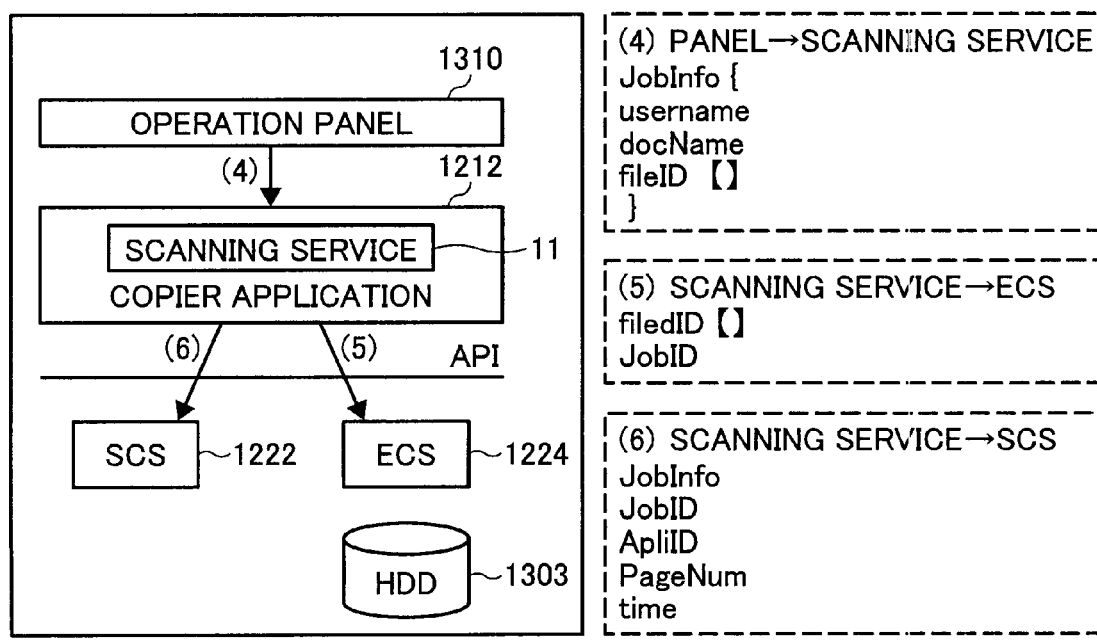
FIG. 14 is a schematic for explaining a scanning service in a copying operation performed by the copier application.

FIG. 14 is a schematic for explaining a process of a scanning service 11 in the copying operation performed by the copier application 1212. The operation panel 1310 accepts an input from the user, and outputs the input information to the copier application 1212 (4). The copier application 1212 generates job information indicative of a process to be performed from the input information, and outputs the job information to the scanning service 11. In this case, the scanning service 11 is implemented by the copier application 1212. The job information includes the user name, the document name, the file ID, and the set number.

When the scanning service 11 receives the job information, the scanning service 11 acquires the file ID and the set number from the job information. The scanning service 11 submits a printing job that includes the file ID, the set number, and a printing job ID to the ECS 1224 (5).

After the job is submitted, the scanning service 11 registers the job to the SCS 1222 by entering the job information, the printing job ID, the application ID indicative of the network file application 1215, the page number, and the time (6). The printing process is controlled by the ECS 1224, and the job status is controlled by the SCS 1222.

The ECS 1224 selects a queue to be printed with reference to the printing priority and extracts a printing job from the selected queue. The ECS 1224 notifies the application 1230 of the status and the finish time of the printing job. In the example shown in FIG. 14, the copier application 1212 represents the application 1230. The copier application 1212 sends information on the indication of the printing job to the SCS 1222. The SCS 1222 stores therein the received information, and displays information on the operation panel 1310 or responds to a request for a job list from the application 1230 based on the stored information.

Figure 15:
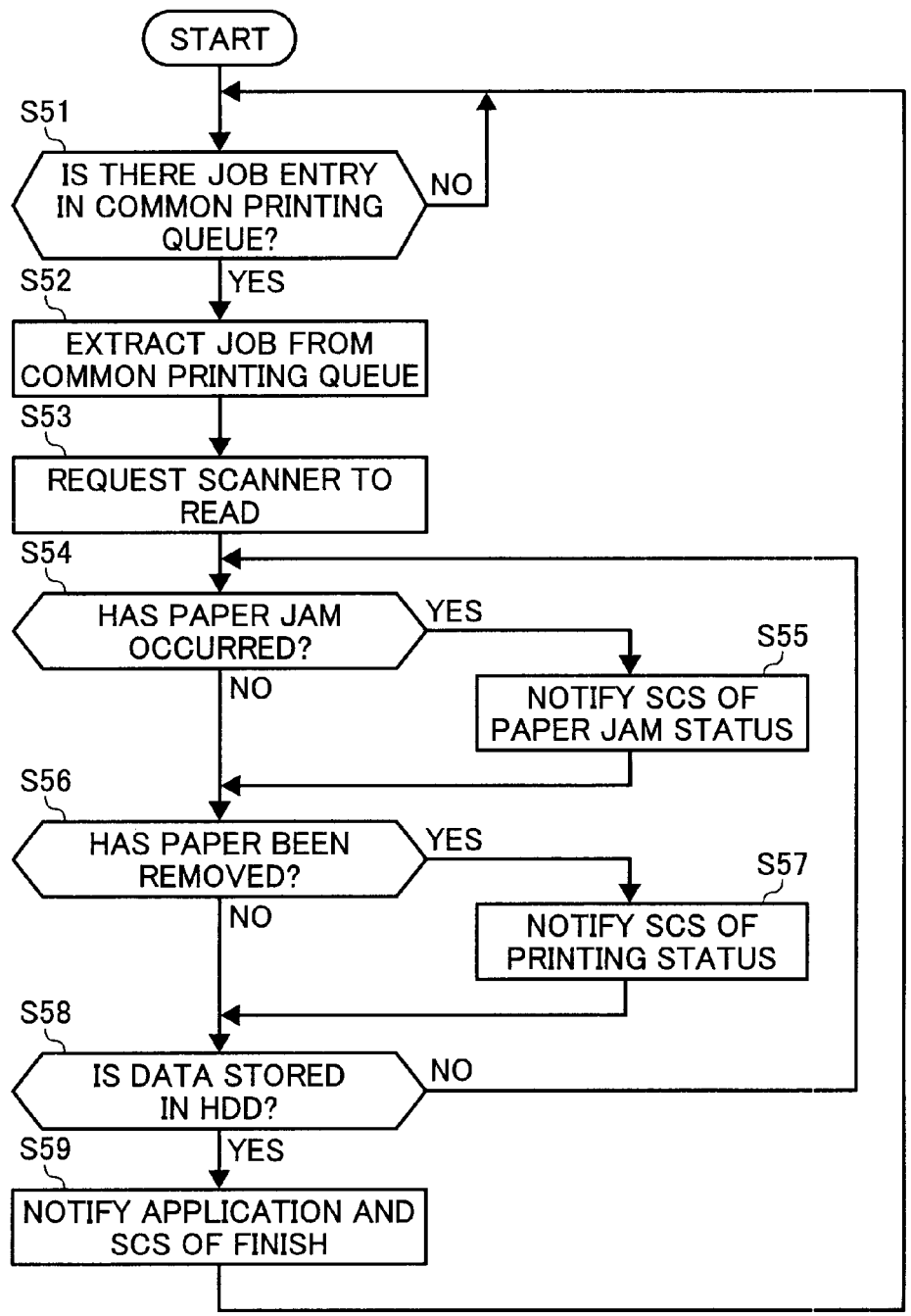
FIG. 15 is a flowchart of a process in which a job management module shown in FIG. 9 scans an original for printing.

FIG. 15 is a flowchart of a process by which the job management module 49 scans an original in the printing process. The job management module 49 determines whether there is a job entry in the common printing queue 50 (step S51). When no job entry is in the common printing queue 50 (NO at step S51), the job management module 49 repeats step S51 until a job is submitted to the common printing queue 50.

When there is a job entry in the common printing queue 50 (YES at step S51), the job management module 49 acquires the job from the common printing queue 50 (step S52). The job management module 49 then requests the scanner 1350 to perform a scanning process that corresponds to the job (step S53).

The job management module 49 determines whether a paper jam has occurred based on receipt of a notice of the paper jam from the scanner 1350 (step S54). When a paper jam has occurred (YES at step S54), the job management module 49 informs the SCS 1222 of a status of the paper jam (step S55). When a paper jam has not occurred (NO at step S54), the job management module 49 does not perform any specific process.

The job management module 49 determines whether the paper jam is fixed based on receipt of a jam-clearance notice from the scanner 1350 (step S56). When the paper jam is fixed (YES at step S56), the job management module 49 sends the status indicative of restarting the printing process to the SCS 1222 (step S57).

The job management module 49 determines whether the scanner 1350 has finished the scanning process and the data is stored in the HDD 1303 (step S58). When the data is not stored in the HDD 1303 (NO at step S58), the job management module 49 repeats steps S54 to S58.

When the data is stored in the HDD 1303 (YES at step S58), the job management module 49 sends a notice of completion to the application that requested scanning (for example, the copier application 1212) and the SCS 1222 (step S59).

After the notice of the paper jam is sent to the SCS 1222, the same process is performed as described above. For example, the notice of the status change is sent from the ECS 1224 to the SCS 1222 as described previously in connection with FIG. 10. The HDD 1303 is then stopped in the same manner as shown in FIG. 11 when the paper jam occurs, and the indication of the paper jam is displayed in the same manner as shown in FIG. 12; however, the indication is different from the example shown in FIG. 13.

Figure 16:
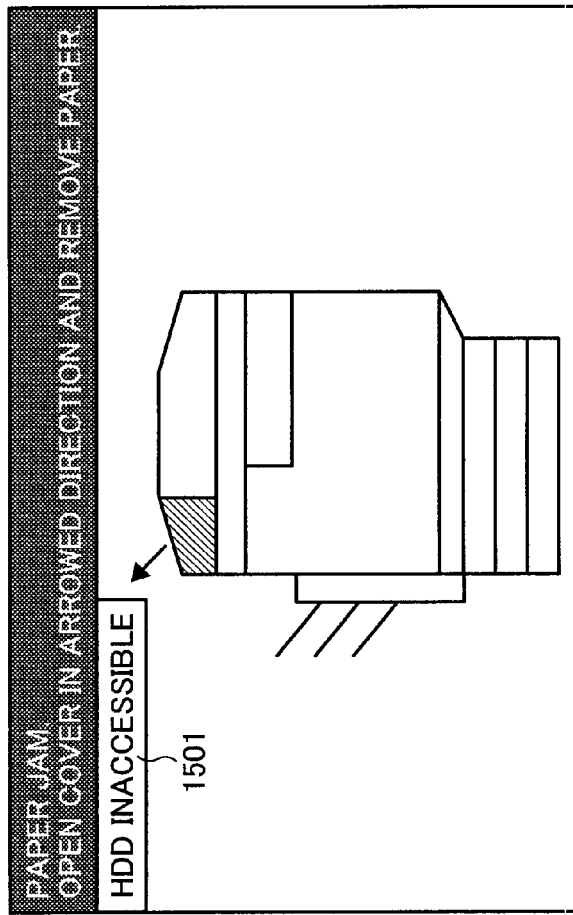
FIG. 16 is an example of a display on the operation panel when a paper jam occurs in the process of scanning the original.

FIG. 16 is an example of the indication that the copier application 1212 displays on the setting display 120 on the operation panel 1310 when a paper jam occurs in the process of scanning originals. The display indicates that the paper is jammed and the action to be taken to remove the paper that caused the paper jam. This enables the user to fix the paper jam. An indication of "HDD INACCESSIBLE" is also displayed in a display area 1501 shown in FIG. 16.

While the embodiment is explained assuming a case of a paper jam, the type of trouble is not limited to the paper jam. The embodiment is applicable to any trouble that can vibrate the MFP 1200 while the user is fixing the trouble. The trouble can be, for example, a lack of toner or the paper feed tray being out of printing paper. When such a trouble occurs, the MFP 1200 stops the HDD 1303 before indicating the warning as described above.

The MFP 1200 according to the embodiment displays the indication of the paper jam after the HDD 1303 stops. However, an output that encourages the user to fix the trouble is not limited to the indication on the display, and the output can be made by sounds, network communication including electronic mail, or lights including a warning light.

As explained above, if a trouble such as a paper jam occurs, the occurrence of the paper jam is displayed on the operation panel 1310 after the HDD 1303 is stopped, and thus the user takes an action to fix the trouble after the HDD 1303 stops. This protects the data in the HDD 1303.

Moreover, if there is an application that is performing a process unrelated to the trouble when the trouble occurs, the application is allowed to access image data in the HDD 1303. The indication of the trouble is not displayed on the operation panel 1310 until the application completes the process. The operation panel 1310 displays the indication of the trouble after the application completes the process, and thereby the data in the HDD 1303 can be protected without interfering the process of the application.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processor comprising:
a rotating magnetic disk that stores therein data;
an accessing unit that accesses the magnetic disk;
a detecting unit that detects an abnormal state caused by a first application, the abnormal state being a state that a user takes an action that may cause the magnetic disk to vibrate;
a control unit that determines whether a second application is accessing the magnetic disk in parallel with the first application, terminates an access from the accessing unit to the magnetic disk, and stops rotation of the magnetic disk in response to the detecting unit detecting the abnormal state caused by the first application, and in response to the control unit determining that the second application is not accessing the magnetic disk; and
an output unit that outputs a request for the action to the user after the control unit has stopped the access and the rotation.

2. The information processor according to claim 1, further comprising a communication unit configured to perform data communication with a communication device via a network, wherein
the control unit determines whether the magnetic disk is being accessed for any one of reading and writing data communicated by the communication unit, and
upon determining that the magnetic disk is being accessed, the control unit retains the access, and stops the rotation after the access is terminated.

3. The information processor according to claim 1, wherein the control unit denies access to the magnetic disk after stopping the rotation until the detecting unit detects no more abnormal state.

4. The information processor according to claim 1, wherein the control unit unloads a magnetic head of the magnetic disk by ramp loading to stop the rotation.

5. The information processor according to claim 1, further comprising an access indicating unit that indicates that the magnetic disk is not accessible after the control unit has stopped the access and the rotation.

6. The information processor according to claim 1, wherein the first application is one of a printer application, a copier application, a facsimile application, a scanner application, a network file application, and a process check application.

7. The information processor according to claim 6, wherein the second application is one of a printer application, a copier application, a facsimile application, a scanner application, a network file application, and a process check application, the first application and the second application being distinct from each other.

8. An image generator comprising:
a rotating magnetic disk that stores therein data;
an accessing unit that accesses the magnetic disk;
a detecting unit that detects an abnormal state caused by a first application, the abnormal state being a state that a user takes an action that may cause the magnetic disk to vibrate;
a control unit that determines whether a second application is accessing the magnetic disk in parallel with the first application, terminates an access from the accessing unit to the magnetic disk, and stops rotation of the magnetic disk in response to the detecting unit detecting the abnormal state caused by the first application, and in response to the control unit determining that the second application is not accessing the magnetic disk; and
an output unit that outputs a request for the action to the user after the control unit has stopped the access and the rotation.

9. The image generator according to claim 8, further comprising a scanning unit that scans data from an original, wherein
the detecting unit detects jamming with the original when the original is fed to be scanned.

10. The image generator according to claim 8, further comprising a printing unit that prints print data on printing paper, wherein
the detecting unit detects jamming with the printing paper when printing is performed.

11. The image generator according to claim 8, further comprising a communication unit configured to perform data communication with a communication device via a network, wherein
the control unit determines whether the magnetic disk is being accessed for any one of reading and writing data communicated by the communication unit, and
upon determining that the magnetic disk is being accessed, the control unit retains the access, and stops the rotation after the access is terminated.

12. The image generator according to claim 8, wherein the control unit denies access to the magnetic disk after stopping the rotation until the detecting unit detects no more abnormal state.

13. The image generator according to claim 8, wherein the control unit unloads a magnetic head of the magnetic disk by ramp loading to stop the rotation.

14. The image generator according to claim 8, further comprising an access indicating unit that indicates that the magnetic disk is not accessible after the control unit has stopped the access and the rotation.

* * * * *